Sept. 11, 1962   A. J. McMASTER ETAL   3,054,005

ELECTRIC MOTOR

Original Filed Feb. 18, 1954

INVENTORS.
Archie J. McMaster
Walter G. Lieberman
Edwin O. Stastny
By: Olson & Trexler   Attys.

3,054,005
ELECTRIC MOTOR
Archie J. McMaster, Bannockburn, Walter G. Lieberman, Prospect Heights, and Edwin O. Stastny, Lombard, Ill., assignors to G-M Laboratories Inc., Chicago, Ill., a corporation of Illinois
Original application Feb. 18, 1954, Ser. No. 411,126, now Patent No. 2,967,346, dated Jan. 10, 1961. Divided and this application Sept. 6, 1957, Ser. No. 682,359
2 Claims. (Cl. 310—43)

This invention is concerned with a small electric motor such as the type used for servomotors in aircraft and the like and the application comprises a division of our co-pending application Serial Number 411,126, filed February 18, 1954, now Patent No. 2,967,346 for Process for Manufacturing Small Motors.

Small electric motors such as are used in servo systems in aircraft and the like must be very accurate in performance. They must be highly shock resistant, and they must be capable of operating over wide temperature ranges. As a result of these requirements, certain of the dimensions of such motors must be held to critical tolerances. Concentricity of the rotor and stator is of extreme importance, and it will be appreciated that, in accordance therewith, the stator and the bearings for mounting the rotor must be mounted quite precisely in the case or housing of the motor.

Accordingly, it is an object of this invention to provide a small electric motor of the type discussed above wherein critical dimensions or tolerances are held to the requisite precision, and yet wherein the motor is simple and economical to fabricate.

More particularly, it is an object of this invention to provide a small electric motor wherein the stator unit is molded in place in the housing, and wherein the molding material forms a part of the central bore of the housing and stator.

It is a further object of this invention to provide a small electric motor as heretofore described wherein the stator unit is impregnated with a molding compound securing the stator unit in place within the housing, and securing the various parts of the stator unit together, wherein the impregnating or molding material is terminated slightly short of the inside diameter of the stator unit.

Other and further objects and advantages of the present invention will be apparent from the following description when taken in connection with the accompanying drawings wherein.

Figure 1:
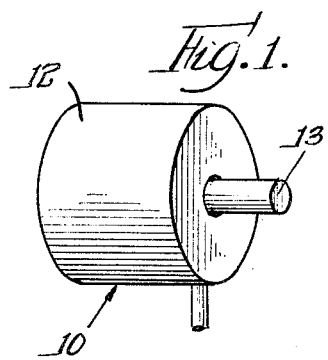
FIG. 1 is a perspective view of a motor constructed in accordance with the principles of this invention.
Figure 2:
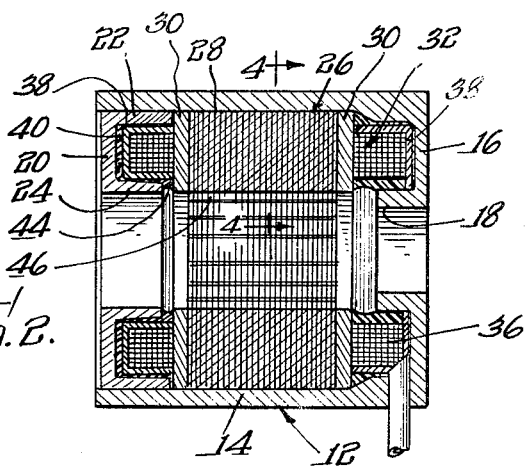
FIG. 2 is a longitudinal sectional view through the housing and stator unit.
Figure 3:
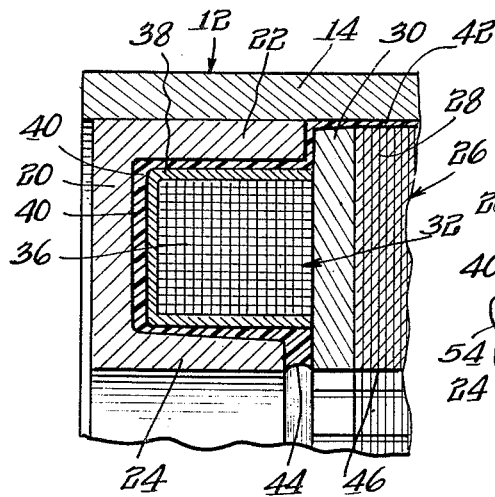
FIG. 3 is an enlarged view corresponding to a fragment of FIG. 2.

Referring now in greater particularity to the drawings, there will be seen an electric motor 10 constructed in accordance with the principles of the invention, including a housing 12. The complete motor includes a rotor (not shown) mounted on a shaft 13 journaled in suitable bearings (not shown). The construction of the stator is substantially conventional as is the mounting of the shaft in the bearings.

The housing 12 includes a cylindrical portion 14 having an end bell 16 integral therewith. The end bell includes an inwardly projecting hub 18 for receipt of one set of bearings. At the opposite end there is provided an inserted end bell 20, having an outer cylindrical portion 22 received in the cylindrical body 14 of the housing, and an inwardly projecting hub 24 for receiving another set of bearings.

The motor further includes a stator unit 26 including a plurality of laminations 28 made of magnet steel and having insulating end laminations 30 of paper, fiberboard, or the like.

The stator unit 26 further includes wires or coil windings 32 received in the usual stator windows 34, and having end turns 36 projecting from the laminations. End caps 38 cover the projecting ends of the coil windings, and these end caps may be of any suitable material such as the usual impregnated insulating paper. The coil wires, as will be understood, are of the usual varnished copper.

Figure 4:
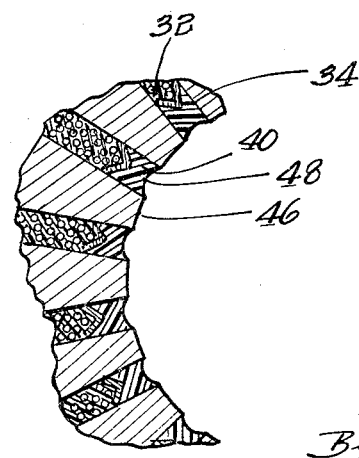
FIG. 4 is a cross-sectional view taken along the line 4—4 in FIG. 2.

The construction as heretofore shown and described is more or less conventional in nature. The essential difference resides in the mounting of the stator unit 26 within the housing 12. The laminations 28 and 30 of the stator are coated with cement about the periphery thereof, and the stator thereby is cemented in the housing. Over and above this, a molded material, preferably a polmerized resin, impregnates the stator unit and occupies all of the space between the housing and the stator unit. This molded material or resin is indicated generally at 40. The cement is indicated at 42, and preferably is of the same material as the molding material, thereby forming a continuation thereof. It is to be noted in particular that the hubs or bearing seats 18 and 24 are spaced from the end or fiber laminations 30. The molded material fills this space, as is indicated at 44, and is terminated radially slightly short of the inside diameter of the stator, as indicated at 46. Furthermore, as will be seen in FIG. 4, the molded material 38 fills the stator windows 34, but is terminated short of the inside diameter 46, as is indicated at 48. It further will be observed that the molded material fits in amongst the wires 32, and, accordingly, augments the insulation initially placed thereon. This is of some importance when it is considered that some of the wires may be crushed out of shape during winding, and this tends to crack the enamel insulation thereon.

Figure 5:
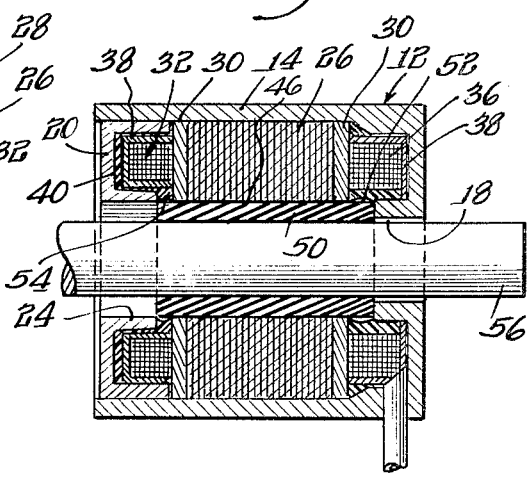
FIG. 5 is a longitudinal sectional view similar to FIG. 2 and showing a step in the manufacture of the motor.

Although the process of manufacturing the motor is shown in considerable detail in the parent application, FIG. 5 illustrates one step in the process whereby the positioning of the molded material will be more fully understood. More particularly, before the molded material is introduced, a rubber tube 50 is inserted through the bearing seat or hub 24 and through the inside diameter or bore 46 of the stator, impinging against the hub or bearing seat 18. The rubber tube bridges the gap between the hub 18 and the adjacent lamination, as is shown at 52, and also bridges the gap between the hub 24 and the adjacent lamination 30, as is indicated at 54. A mandrel 56 of steel or the like is inserted through the rubber tube 50, and expands the rubber tube so that it bulges radially slightly in the areas indicated at 52 and 54, and also bulges slightly into the stator windows. It is for this reason that the resin or molded material, which subsequently is introduced by a vacuum process, is disposed radially short of the inside diameter of the stator and of the hub 24.

It now will be seen that the stator is firmly and critically mounted within the housing without the necessity of having the end bells, particularly the hubs or bearing seats thereof, contact the stator unit. The molded material which mounts the stator unit in place serves as a part of the bore of the motor. It secures the various parts of the stator unit against shifting with changes in temperature and as a result of physical shocks, and also serves as additional insulation. Furthermore, the material is terminated short of the inside diameter or bore of the stator unit and bearing seat, whereby to be positioned completely out of the way from any contact by the rotor.

The specific example of the invention as herein shown and described is for illustrative purposes. Various changes in structure will no doubt occur to those skilled in the art, and it is to be understood that such changes comprise a part of this invention insofar as they fall within the spirit and scope of the appended claims.

The invention is claimed as follows:

1. In an encapsulated precision miniature rotary electric machine the combination comprising a housing having a pair of end pieces with bearing support means therein, a laminated stator permanently mounted in said housing and spaced axially from at least one of said end pieces and being free of compression thereby, said stator with said housing substantially defining a space, said stator having a central bore, and insulating material completely filling the space between said housing and said stator and permanently securing said stator encapsulated in said housing, said central bore being free of said insulating material, at least said one end of said stator being axially free except for said insulating material, said end pieces having central bores coaxial with said stator bore.

2. A rotary electric machine as set forth in claim 1 wherein said stator is provided with pole tips confronting said bore and defining radially inwardly opening slots in said stator, and stator windings in said slots, said insulating material being in said slots and terminated adjacent but short of the radially inward extremities of the pole tips, said pole tips being free.

References Cited in the file of this patent

UNITED STATES PATENTS

| | | |
|---|---|---|
| 1,440,952 | Apple | Jan. 2, 1923 |
| 1,921,111 | Apple | Aug. 8, 1933 |
| 2,636,137 | Andrus | Apr. 21, 1953 |
| 2,654,848 | Schaefer | Oct. 6, 1953 |
| 2,668,925 | Bloser | Feb. 9, 1954 |
| 2,688,103 | Sheldon | Aug. 31, 1954 |
| 2,922,902 | Hargreaves | Jan. 26, 1960 |